United States Patent [19]

Goodrich et al.

[11] 4,329,387
[45] May 11, 1982

[54] PREPREG MATERIAL HAVING INCREASED SURFACE TACK

[75] Inventors: Richard B. Goodrich, Pleasanton; Richard J. Moulton, Concord, both of Calif.

[73] Assignee: Hexcel Corporation, San Francisco, Calif.

[21] Appl. No.: 75,763

[22] Filed: Sep. 17, 1979

Related U.S. Application Data

[62] Division of Ser. No. 909,072, May 24, 1978, Pat. No. 4,213,930.

[51] Int. Cl.³ ............................ B32B 3/00; B32B 27/14
[52] U.S. Cl. .................................... 428/196; 428/212; 428/218; 428/225; 428/245; 428/260; 428/268; 428/408; 428/902
[58] Field of Search ............... 428/195, 196, 198, 212, 428/218, 221, 224, 225, 245, 247, 251, 262, 265, 408, 902, 268, 287, 290; 427/389.9, 412; 156/290, 291

[56] References Cited

U.S. PATENT DOCUMENTS

| | | | |
|---|---|---|---|
| 2,855,327 | 10/1958 | Gilchrist et al. | 428/195 |
| 3,117,053 | 1/1964 | Lawrence et al. | 428/195 |
| 3,186,866 | 6/1965 | Claeys | 428/196 |
| 3,737,368 | 6/1973 | Such et al. | 156/290 |
| 3,808,088 | 4/1974 | Knechtges et al. | 156/291 |
| 3,908,058 | 9/1975 | Russell | 427/412 |
| 3,964,952 | 6/1976 | Brié et al. | 427/412 |
| 3,971,669 | 7/1976 | Wrzesien et al. | 427/412 |
| 3,972,765 | 8/1976 | Kondo et al. | 427/412 |
| 4,024,305 | 5/1977 | Alpaugh et al. | 427/412 |
| 4,076,881 | 2/1978 | Sato | 428/195 |

*Primary Examiner*—James J. Bell
*Attorney, Agent, or Firm*—Townsend and Townsend

[57] ABSTRACT

A prepreg having substantially no excess resin while at the same time having an aggressive tack. Small discrete amounts of additional resin are selectively applied to a surface of the prepreg sheets in a regular array. The resin is applied at a sufficient viscosity that it does not sink into the prepreg fabric. The additional resin typically covers less than 25% of the surface and constitutes between 0.1% and 3% of the prepreg weight. The additional resin may be applied by a gravure roller having a surface etched with an appropriate array of indentations. A doctor blade partially defines a reservoir of resin in contact with a portion of the gravure roller and wipes the surface, thereby leaving resin only in the indentations. The doctor blade may be oscillated parallel to the roller axis to prevent accumulations of short fibers from impairing the wiping action.

21 Claims, 5 Drawing Figures

PREPREG MATERIAL HAVING INCREASED SURFACE TACK

This is a division of application Ser. No. 909,072, filed May 24, 1978 now U.S. Pat. No. 4,213,930.

BACKGROUND OF THE INVENTION

It is known to fabricate structural elements from resin/filament composite systems in which the filaments provide the tensile strength and the resin serves as a matrix to maintain the filaments in alignment. The filament material is often in the form of a fabric woven from tow, relatively loose strands of essentially untwisted filaments. The filaments may be glass, high modulus graphite, or other material having desired characteristics. The fabric may then be impregnated with a suitable resin such as an epoxy, polyester or polyimide resin to form what is known as prepreg material which, generally speaking, comprises flat sheets of fabric impregnated with uncured resin. Layers of prepreg are typically laminated and cured at high temperature and pressure to form the desired article.

The proportion of resin to filament is dictated by the strength-to-weight requirements of the fabricated parts. In particular, since the tensile strength comes from the filaments rather than the resin, a low resin content is desirable. While the proportions will vary according to the materials and the application, a cured prepreg sheet comprising a woven graphite fabric (made of high modulus carbon filaments) impregnated with a 350° F. curing epoxy resin should contain approximately 35% resin by weight.

However, the lay-up procedure for molding the prepreg sheets sometimes requires placement of one or more sheets against a non-horizontal surface, as for example a vertical mold surface. It is thus necessary that the prepreg be sufficiently tacky to stick to such a surface during the lay-up. As a practical matter it is, therefore, necessary that some uncured resin is present on the faces of the prepreg. It has been found that a prepreg containing the desired end proportion of resin is insufficiently tacky to be suitable for lay-up against non-horizontal surfaces because substantially all resin is absorbed by the fabric.

The common solution to the problem has been to impregnate the fabric with a resin content in excess of that required in the cured article (e.g. 42% rather than 35%) and to bleed the excess resin off during the curing process. This is accomplished by laying porous cloth such as fiberglass cloth over the assembled prepreg sheets, but separated from them by a porous release film, so that the excess resin can be absorbed by the fiberglass bleeder which is later removed.

It is immediately evident that such a solution is wasteful, particularly when costly resin is used. Since the resin that is bled off is subjected to the same temperature and pressure as that remaining in the prepreg sheets, it cures, and cannot be recovered for subsequent use.

An additional difficulty with the use of so-called "excess resin" prepregs is that it may be difficult or impossible in certain applications to properly bleed off the excess. Moreover, the proper thickness and weight of the fiberglass bleeder is a variable function of the resin content and the prepreg fabric. Thus, even though the proper bleeder parameters can be established empirically, the use of bleeders represents an additional complexity and a potential source of failure.

SUMMARY OF THE INVENTION

The present invention provides a method and apparatus for supplying a prepreg having substantially no excess resin while at the same time having an aggressive tack, making it suitable for applications where such a tack is necessary.

Broadly, the invention involves the selective deposition of small discrete amounts of additional resin in a regular pattern over at least one surface of the prepreg sheet. The additional resin thus applied typically covers less than 25% of the prepreg surface and constitutes in the range of between about 0.1% to 3% by weight with a presently preferred amount being about ½% of the prepreg weight. The resin content of the prepreg prior to the application of the resin pattern can be adjusted so that the prepreg, including both the impregnating resin and the subsequently applied resin, has the desired total resin content.

The amount of resin applied is sufficiently small and sufficiently uniformly dispersed that the cured layer is uniform. At the same time, and in spite of the smallness of the amount involved, the additional resin provides the necessary tackiness that was previously attainable only by impregnating the fabric with a high excess of resin.

The resin is preferably applied by a gravure process in which the prepreg is passed over and biased against a gravure roll whose surface is partially etched with a pattern of indentations. In a presently preferred embodiment of the invention, the additional resin is applied in generally parallel bands which extend across the width of the prepreg material and which have a spacing of between ¼" to ½" and preferably of approximately 9/32". Each such band is in turn defined by a multiplicity of individual, aligned indentations in the roller surface which may have a size, for example, of about 0.018" square, a spacing between the indentations of about 0.02" and an overall band width of about 1/16".

A portion of the gravure roll may be partially immersed in a reservoir of resin to pick up a layer of resin as it rotates. Alternatively, the resin may be applied to the gravure roll with suitable applicator rolls, for example. A doctor blade partially defines the reservoir and wipes excess resin off the roll, thereby leaving resin only in the indentations. As the prepreg passes between the gravure roll and an opposed biasing roll, the resin is deposited in a uniform pattern corresponding to the pattern of indentations. The doctor blade may be oscillated in a direction parallel to the axis of the roll to prevent accumulations of short fibers from impairing the wiping action.

The selectively applied resin is preferably the same formulation as the impregnating resin, and for critical applications it is taken from the same batch of resin to eliminate any possible non-uniformity in the finished product.

DETAILED DESCRIPTION OF THE INVENTION

Figure 1:
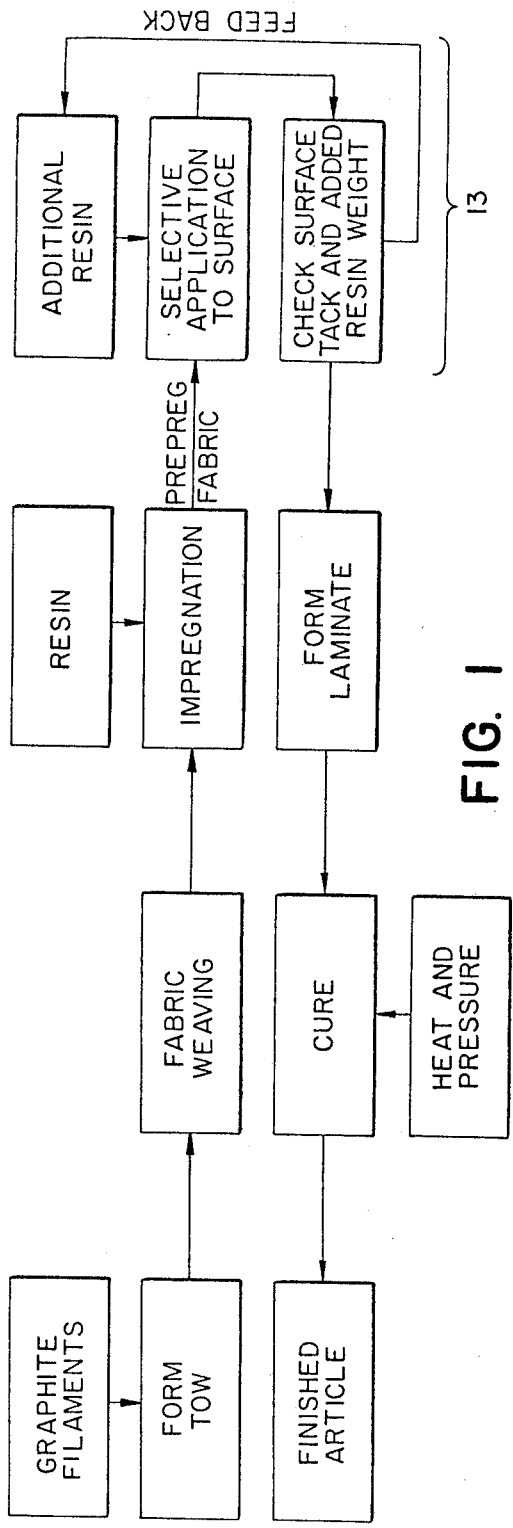
FIG. 1 is a flow diagram illustrating the method of forming articles from carbon filament, resin impregnated materials in accordance with the present invention.

Referring first to FIG. 1, the overall process for making a finished article from resin impregnated material (prepreg) is described. Initially, fine high modulus graphite filaments are formed into a graphite filament tow of say 3,000 essentially unidirectional, untwisted filaments. The tow can, of course, be constructed of other materials such as glass filaments. Next, the tow is woven into a fabric. Depending on the tow material and the intended use, the fabric may be a relatively open weave with interstices between the tows, or it may be a close weave material.

Figure 3:
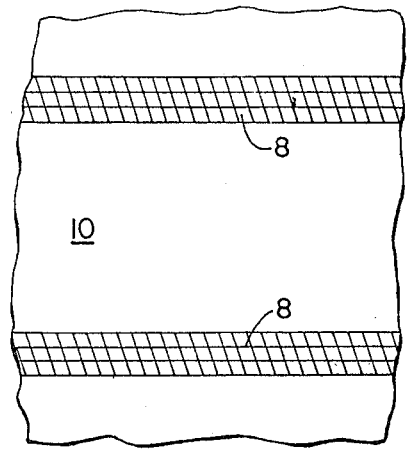
FIG. 3 is a plan view of a segment of prepreg material to which additional resin has been applied in accordance with the present invention.

The fabric is then impregnated with resin to form a prepreg fabric material, the resin being typically deposited into the fabric from a solution. The amount of resin generally depends on the materials involved and the desired end use. However, the present invention is directed to those applications wherein the total resin content is that envisioned for the finished article. In other words, the present invention is directed to a so-called "net resin" prepreg which can be cured without having to bleed off excess resin. As an example, in a preferred embodiment of the invention, a high modulus graphite fabric is impregnated with an amount of resin which generally represents approximately 35% by weight of the prepreg material. While certain applications require that the prepreg exhibit surface tack, such a prepreg has very little surface tack. In order to achieve the desired surface tack by prior art methods, a resin content of approximately 42% would have been necessary. A "net resin" prepreg exhibiting sufficient tack is achieved by selectively coating at least one surface of the prepreg material with a small amount of additional resin. As can be seen in FIG. 3, discrete amounts of additional resin 8 are applied in a regular pattern to at least one surface of prepreg 10. For simplicity, FIG. 3 shows prepreg 10 as a solid sheet, and does not show the actual surface texture (individual tows). In the presently preferred embodiment, the pattern of application is a series of parallel bands across the width of the material and covering 10–30% of the surface. The additional resin is applied in a relatively viscous form so that it does not sink into the material, but rather remains on the surface. The viscosity can be adjusted by use of the proper amount of a suitable solvent.

Figure 4:
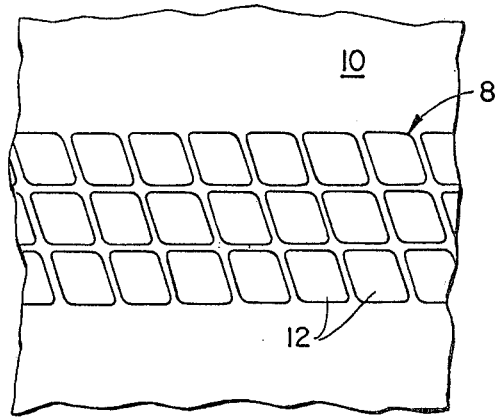
FIG. 4 is an enlarged fragmentary view of FIG. 3, showing a preferred pattern of resin application.

FIG. 4 shows an enlarged view of one band of resin 8. It can be seen that each band comprises numerous discrete areas of resin 12, shown arranged in a regular array. In a presently preferred embodiment of the invention, bands 8 have a width of approximately 0.058" and a center-to-center spacing of approximately 0.288". The individual regions 12 may be squares or parallelograms having approximately 0.018" sides and spaced apart by approximately 0.002".

In order to maintain uniformity in the finished article, the amount of additional resin is kept low, being in the range of approximately 0.1% to 3% of the prepreg weight, with the preferred range being 0.5% to 1.5%. The impregnation step described above is preferably carried out to a resin content less than the resin content of the finished article by an amount corresponding to the additional resin to be deposited on the surface. The additional resin applied to the surface is preferably chemically the same as the impregnating resin, and for certain critical applications is taken from the same batch.

The coated prepreg is then inspected and tested to insure that the additional resin content is in the proper range and that the coated prepreg exhibits the desired amount of surface tack. This information can then be used as a feedback to increase or decrease the amount of resin that is applied.

Thereafter, the coated prepreg material is laminated, typically in a mold or other configuration in which surface tack is required, as for example, in a mold where some of the surfaces are not horizontal. Heat and pressure are applied to the prepreg to cure the resin and form the finished article. It has been determined that sufficient tack for use in such mold applications is achieved by the coating step, and that the additional resin does not cause perceptible non-uniformities in the finished article.

Figure 2:
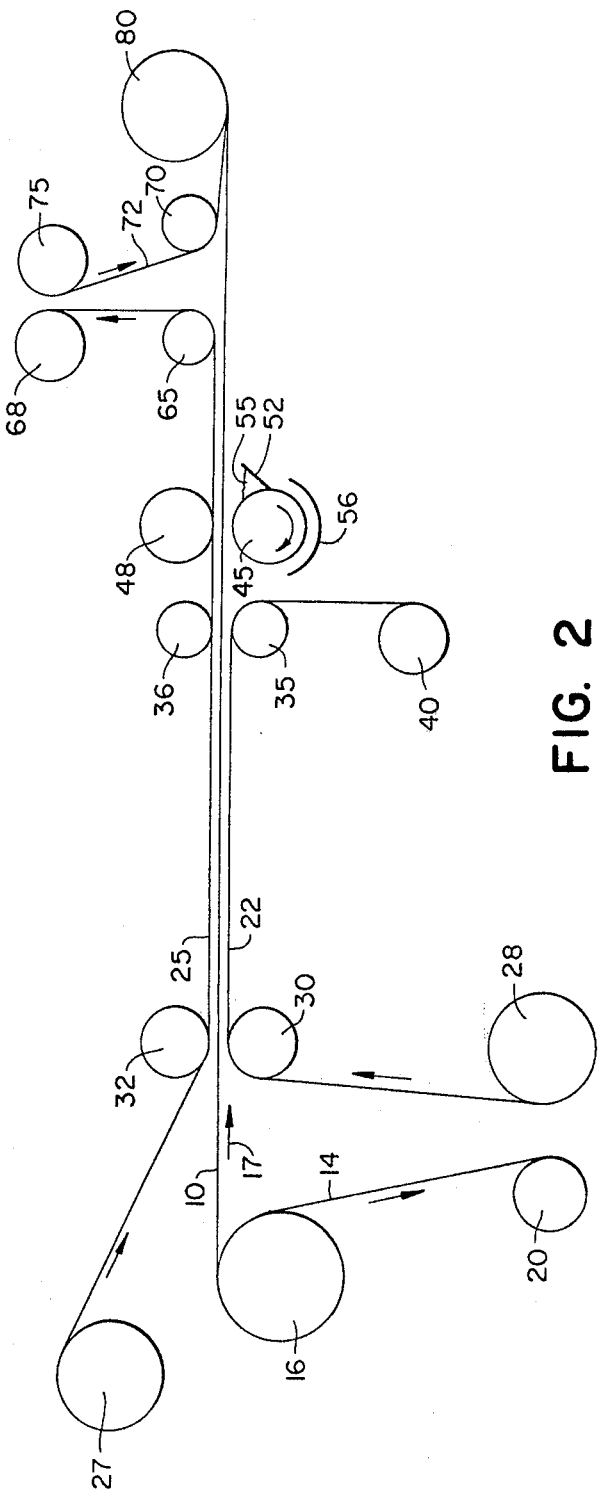
FIG. 2 is a schematic side elevational view of equipment constructed and operated in accordance with the present invention to increase the surface tack of prepreg material without requiring excess resin content.
Figure 5:
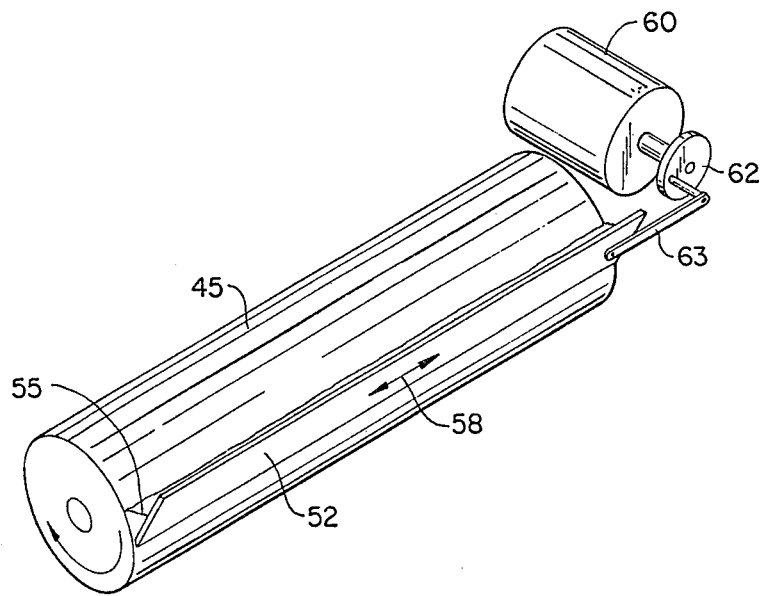
FIG. 5 is a schematic perspective view of a coating roller and resin reservoir configuration.

While the present invention relates to the entire process outlined above, it is most specifically directed to the intermediate steps, denoted by reference numeral 13 in FIG. 1, of selectively applying small amounts of resin to a surface of the prepreg and monitoring the tack and additional resin content. FIGS. 2 and 5 illustrate in schematic form a machine for applying the additional resin to the prepreg material. Prepreg 10 is normally supplied in roll form with a length of as much as 100 feet or more wound on a roll 16. The width is typically one of a small number of standard widths, such as 42 inches. Prepreg 10 may be preplied with a polyethylene separator layer 14 before it is wound on roll 16.

Generally, the prepreg/polyethylene composite is unwound from roll 16 and fed along direction 17 into the machine of FIG. 2 which removes polyethylene layer 14, sandwiches prepreg 10 between release paper layers, removes at least one release paper layer, applies additional resin by a gravure process, removes any remaining release paper layer, reapplies a polyethylene separator layer, and rewinds the prepreg on a take-up roll for subsequent use.

Referring more particularly to FIG. 2, prepreg 10 is fed off prepreg payoff roll 16 while polyethylene separator layer 14 is continuously removed and wound on polyethylene take-up roll 20. Prepreg 10 is then supplied with lower and upper release paper layers 22 and 25 which are fed from lower and upper release paper payoff rolls 27 and 28, respectively. Release paper 22 passes over lower roller 30, release paper layer 25 passes under upper roller 32, and prepreg 10 passes therebetween, thereby forming a sandwich. Although the three layers of the sandwich are shown for clarity as separated, in actual operation, rollers 30 and 32 are biased toward one another to bring the three layers into intimate contact. The sandwich then passes between drive roller pair 35 and 36. Lower release paper layer 22 is passed over and partially around lower drive roller 35, being wound on release paper take-up roll 40.

Prepreg 10 and upper release paper layer 25 then pass between gravure roller 45 and upper gravure biasing roller 48. Gravure roller 45, located underneath the prepreg, has a smooth surface into which are etched numerous indentations in a pattern corresponding to the pattern of desired resin applications illustrated in FIGS. 3 and 4. A typical etch depth of 0.005" is preferred to achieve the desired resin coating.

A doctor blade 52 contacts gravure roller 45 along an axial line on the downwardly moving (downstream) portion of gravure roller 45, and extends angularly upward away from gravure roller 45 to contain resin reservoir 55. Small, generally triangular dams (not shown) are fitted to doctor blade 52 to prevent resin from running out at the axial extremes, while a pan 56 under gravure roller 45 and doctor blade 52 catches any resin that drips down. As gravure roller 45 rotates, the portion of its surface that is in contact with resin reservoir 55 passes under doctor blade 52 which wipes the surface clean and leaves resin only on the indentations. When that portion contacts the prepreg surface, resin is transferred from the indentations to the prepreg surface. It can be seen that a disposition of reservoir 55 along a generally vertical surface of the roller has the advantage that it can be applied to an upper or lower gravure roller, should it be desired to apply resin to an upper surface of the prepreg.

It has been found that an accumulation of short filament fragments build up on roller 45, and that these filament fragments could prevent doctor blade 52 from effectively wiping the resin from the surface of the roller between the indentations. To alleviate this problem, means is provided to oscillate doctor blade 52 in a transverse direction denoted by doubleheaded arrow 58 that is parallel to the axis of gravure roller 45. Suitable oscillation means includes a motor 60, a crank 62, and a crankshaft 63, wherein rotational motion of the motor is converted to reciprocating motion.

The coated prepreg and release paper layer then pass under release paper deflection roller 65 whereupon release paper layer 25 is separated from prepreg 10 and wound onto release paper take-up roll 68. Prepreg 10 then passes under roller 70 which plies it with polyethylene separator layer 72 from polyethylene supply roll 75. The treated prepreg/polyethylene composite is then wound onto prepreg take-up roll 80. The amount of resin deposited depends on many factors, including the pressure applied by gravure roller 45 to the prepreg, the solids content of the resin solution 55, and the viscosity of resin 55. The concentration of resin 55 also affects the additional tack imparted to the prepreg, even if the desired additional amount is applied, since a deposition of resin in a relatively viscous condition causes the resin to remain on the surface, but a deposition of very fluid resin can result in the resin being absorbed into the fabric and being unable to impart tack. This is exactly what happens in the impregnation step. The proper operating conditions are relatively easily determined empirically by coating a small sample of prepreg as described above, weighing it to determine the additional resin, and testing its tack to determine whether it complies with the requirements of the particular application.

It is important that the tension on the prepreg material during passage through the machine be kept even to avoid creasing of the prepreg. Since the graphite filaments have very little shear strength, the formation of creases, aggravated by the passage of the prepreg between opposed roller pairs can result in severe weaknesses in the prepreg material. Thus, it is important that the various rollers be carefully aligned. The maintenance of even tension also requires that the speed of release paper layers 22 and 25 precisely match the speed of prepreg 10 through the machine. To achieve this result, the tensions in the various rollers are carefully controlled to ensure even transmission along direction 17. For example, rollers 30, 32, 35, 36, 45, and 48, or at least one roller in each opposed pair, are preferably driven by torque adjustable motors, the torques of which are adjusted so that no travel occurs when all motors except those driving rollers 30 and 32 are activated, but that transport does occur when rollers 30 and 32 are also energized.

While the machine of FIG. 2 illustrates a single gravure roller applying resin to portions of one surface of prepreg 10, the invention is not so limited. If it is necessary or desired to apply additional resin to both surfaces of the prepreg, this can be done by using opposed gravure rollers. Additionally, while a gravure process is the presently preferred method of applying resin, any suitable printing or coating method could be used.

We claim:

1. An article of manufacture adapted to be molded into a resin/filament composite product by placing the article in a mold and applying heat and pressure to the article while in the mold, the product being characterized by a desired amount of resin, the article comprising:
   - a fabric defined by a multitude of individual high modulus graphite filaments;
   - an amount of uncured resin impregnating the fabric and being controlled so that it is less than the desired amount of resin in the article, the amount of resin being further such that substantially the entire amount of resin is absorbed into the fabric; and
   - a multiplicity of discrete quantities of uncured resin applied to at least one surface of the fabric and being spaced apart thereon, the quantities of resin having a relatively high viscosity so that they remain on the surface and render such surface relatively tacky, the quantities of resin being selected so that they represent the difference between the desired amount of resin in the article and the amount of resin impregnating the fabric.

2. An article according to claim 1 wherein the quantity of resin applied to the fabric is chemically the same resin as the amount of resin impregnating the fabric.

3. An article according to claim 1 wherein the quantities of resin are substantially evenly distributed over the entire surface.

4. An article according to claim 1 wherein the fabric is a fabric defined by woven filaments.

5. An article according to claim 1 wherein the filaments are arranged in tows of substantially unidirectional, unspun filaments.

6. An article according to claim 1 wherein the quantity of resin represents between about 0.1% to about 3% of the weight of the article.

7. An article according to claim 3 wherein the quantities are arranged in parallel strips, at least some of which are spaced apart from each other by at least about ¼".

8. An article according to claim 7 wherein some of the parallel strips are spaced apart by a distance substantially less than ¼".

9. An article of manufacture adapted to be molded into a resin/filament composite product by placing the article in a mold and applying heat and pressure to the article while in the mold, the product being characterized by a desired amount of resin, the article comprising:
- a fabric defined by a multitude of individual filaments;
- an amount of uncured resin impregnating the fabric and being less than the desired amount of resin in the article, the amount of resin being substantially uniformly absorbed into the fabric; and
- a quantity of uncured resin applied to at least one surface of the fabric, the quantity of resin having a relatively high viscosity and being applied so that it remains on the surface and renders such surface relatively tacky, the quantity of resin being selected so that it represents the difference between the desired amount of resin in the article and the amount of resin impregnating the fabric.

10. An article according to claim 9 wherein the quantity of resin applied to the fabric is chemically the same resin as the amount of resin impregnating the fabric.

11. An article according to claim 9 wherein the quantity of resin is applied to at least one surface at a multiplicity of areas of that surface, the areas being spaced apart and substantially evenly distributed over the entire surface.

12. An article according to claim 9 wherein the fabric is a fabric defined by woven filaments.

13. An article according to claim 12 wherein the filaments comprise high modulus graphite filaments.

14. An article according to claim 13 wherein the filaments are arranged in tows of substantially unidirectional, unspun filaments.

15. An article according to claim 9 wherein the quantity of resin represents between about 0.1% to about 3% of the weight of the article.

16. An article according to claim 11 wherein at least some of the areas are spaced apart from other ones of the areas by at least about $\frac{1}{4}''$.

17. An article according to claim 16 wherein some of the areas are spaced apart a distance substantially less than $\frac{1}{4}''$.

18. In a net resin prepreg comprising filament fabric and uncured resin, the improvement wherein a major portion of the resin is absorbed substantially uniformly throughout the fabric and the remaining portion of resin resides substantially on at least one surface of the fabric to impart surface tack to the prepreg.

19. The prepreg of claim 18 wherein the remaining portion of resin represents about 0.1% to about 3% of the weight of the prepreg.

20. The prepreg of claim 18 wherein the fabric comprises woven tows of substantially untwisted high modulus graphite filaments.

21. A prepreg comprising:
- woven graphite fabric representing about 65% of the prepreg weight; and
- resin representing about 35% of the prepreg weight with a quantity of resin representing about 0.1% to about 3% of the prepreg weight residing on at least one surface of the fabric with the rest of the resin substantially uniformly absorbed in the fabric, the quantity of resin having a higher viscosity when applied than the resin representing about 35% of the prepreg weight.

* * * * *